(12) United States Patent  (10) Patent No.: US 7,975,410 B2
Faivre et al.  (45) Date of Patent: Jul. 12, 2011

(54) ADAPTIVE EXCAVATION CONTROL SYSTEM HAVING ADJUSTABLE SWING STOPS

(75) Inventors: Joseph Leo Faivre, Edelstein, IL (US); Roger Dale Koch, Pekin, IL (US); Brahmaramba Tallapragada, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 452 days.

(21) Appl. No.: 12/155,195

(22) Filed: May 30, 2008

(65) Prior Publication Data

US 2009/0293322 A1 Dec. 3, 2009

(51) Int. Cl.
*G05D 1/02* (2006.01)
(52) U.S. Cl. ............ 37/348; 37/379; 37/413; 37/443; 701/50
(58) Field of Classification Search ............ 37/348, 37/379, 347, 411, 413, 443, 382; 701/50; 414/699; 172/4–8
See application file for complete search history.

(56) References Cited

U.S. PATENT DOCUMENTS

| | | | | |
|---|---|---|---|---|
| 4,358,989 A * | 11/1982 | Tordenmalm | ............... | 91/361 |
| 4,888,890 A * | 12/1989 | Studebaker et al. | ............ | 37/348 |
| 5,088,020 A * | 2/1992 | Nishida et al. | ............... | 700/40 |
| 5,257,177 A | 10/1993 | Bach et al. | | |
| 5,347,448 A * | 9/1994 | Nam | ............... | 700/65 |
| 5,361,211 A * | 11/1994 | Lee et al. | ............ | 701/50 |
| 5,404,661 A * | 4/1995 | Sahm et al. | ............ | 37/348 |
| 5,572,809 A | 11/1996 | Steenwyk et al. | | |
| 5,701,691 A * | 12/1997 | Watanabe et al. | ............ | 37/348 |
| 5,711,022 A * | 1/1998 | Steenwyk | ............ | 701/50 |
| 5,713,144 A * | 2/1998 | Haraoka | ............ | 37/348 |
| 5,735,065 A * | 4/1998 | Yamagata et al. | ............ | 37/348 |
| 5,752,333 A * | 5/1998 | Nakagawa et al. | ............ | 37/348 |
| 5,768,810 A * | 6/1998 | Ahn | ............ | 37/348 |
| 5,835,874 A * | 11/1998 | Hirata et al. | ............ | 701/50 |
| 5,960,378 A * | 9/1999 | Watanabe et al. | ............ | 702/150 |
| 5,968,104 A * | 10/1999 | Egawa et al. | ............ | 701/50 |
| 6,032,093 A * | 2/2000 | Denbraber et al. | ............ | 701/50 |
| 6,076,029 A * | 6/2000 | Watanabe et al. | ............ | 701/50 |
| 6,230,090 B1 * | 5/2001 | Takahashi et al. | ............ | 701/50 |
| 6,282,453 B1 * | 8/2001 | Lombardi | ............ | 700/63 |
| 6,332,103 B1 * | 12/2001 | Steenson et al. | ............ | 701/1 |
| 6,371,214 B1 * | 4/2002 | Anwar et al. | ............ | 172/1 |
| 6,405,114 B1 * | 6/2002 | Priestley et al. | ............ | 701/50 |
| 6,532,738 B2 * | 3/2003 | Sharkness et al. | ............ | 60/468 |
| 6,666,125 B2 * | 12/2003 | Gunzenhauser | ............ | 91/172 |
| 6,725,142 B2 * | 4/2004 | Koch | ............ | 701/50 |
| 7,274,976 B2 * | 9/2007 | Rowe et al. | ............ | 701/1 |

(Continued)

*Primary Examiner* — Thomas A Beach
*Assistant Examiner* — Matthew R Buck
(74) *Attorney, Agent, or Firm* — Finnegan, Henderson, Farabow, Garrett & Dunner LLP

(57) ABSTRACT

A control system for use with an excavation machine is disclosed. The control system may have a boom member, a linear actuator connected to pivot the boom member in a first direction, a rotary actuator connected to swing the boom member in a second direction substantially orthogonal to the first direction, and an operator input device configured to generate a command signal indicative of a desired movement of the boom member. The control system may also have a tilt sensor configured to detect an inclination of the excavation machine, and a controller in communication with the rotary actuator, the operator input device, and the tilt sensor. The controller may be configured to receive a swing end stop for the boom member, to control the rotary actuator to move the boom member based on the command signal, and to modify the command signal to inhibit movement of the boom member past the swing end stop based on the detected inclination of the excavation machine.

20 Claims, 2 Drawing Sheets

U.S. PATENT DOCUMENTS

| | | | |
|---|---|---|---|
| 7,318,292 B2 * | 1/2008 | Helbling et al. | 37/348 |
| 7,451,028 B2 * | 11/2008 | Pillar et al. | 701/50 |
| 7,532,967 B2 * | 5/2009 | Fujishima et al. | 701/50 |
| 2003/0172802 A1 | 9/2003 | Gunzenhauser | |
| 2008/0000111 A1 * | 1/2008 | Green | 37/348 |
| 2009/0118913 A1 * | 5/2009 | O'Halloran et al. | 701/50 |

* cited by examiner

ADAPTIVE EXCAVATION CONTROL SYSTEM HAVING ADJUSTABLE SWING STOPS

TECHNICAL FIELD

The present disclosure relates generally to an excavation control system, and more particularly, to an adaptive excavation control system having adjustable swing stops.

BACKGROUND

Control of an excavation machine can be a difficult task to perform productively and efficiently, without causing operator fatigue. Such control can require years of experience and a high level of skill that not all operators possess. In order to improve performance of an excavation machine, even when controlled by inexperienced or low-skill operators, limitations on certain movements of the machine can be selectively implemented. For example, a limitation on the movement range of a machine tool can help prevent unnecessary movements into protected regions where undesired collisions and work delays could occur. In some situations, the limitations can be set by an operator of the machine based on a particular application and/or a desired work surface contour.

One example of an excavation system implementing selective movement limitation is disclosed in U.S. Pat. No. 5,968,104 (the '104 patent) issued to Egawa et al. on Oct. 19, 1999. In particular, the '104 patent discloses a hydraulic excavator having an area limiting excavation control system. The area limiting excavation control system comprises a setting device for providing an operator instruction to set an excavation area where an end of a bucket is allowed to move. The area limiting excavation control system also comprises angle sensors disposed at pivot points of a boom, an arm, and a bucket for detecting respective rotational angles and velocities thereof, a tilt angle sensor for detecting a tilt angle of the excavator's body in a back-and-forth direction (fore/aft direction), and a pressure sensor for detecting a load pressure of the boom as it is moved upward in response to signals generated by a control lever.

The area limiting excavation control system limits a speed of the bucket based on changing machine parameters. Specifically, as the bucket nears a boundary of the operator set excavation area during a fore/aft or up/down movement operation (i.e., during a digging operation), the speed of the bucket is slowed in the direction of the boundary such that the bucket stops at the boundary of the excavation area without exiting the excavation area. And, the stopping of the bucket is accurately and smoothly controlled by adapting flow rate characteristics of control valves associated with movement of the bucket for changing machine parameters such as speed, load, position, posture, and temperature.

Although the area limiting control system of the '104 patent may improve operator control and machine performance of a hydraulic excavator in a fore/aft direction, it may be limited. In particular, the system of the '104 patent may do little for control over a swinging of the excavator during a side-to-side movement operation (i.e., during a non-digging operation such as a swing-to-truck or a return-to-trench movement). In addition, the system of the '104 patent may not account for side-to-side tilting (i.e., rolling) of the excavator that can have a significant impact on the swinging velocities and forces of the excavator.

The disclosed control system is directed to overcoming one or more of the problems set forth above.

SUMMARY

One aspect of the present disclosure is directed to control system for use with an excavation machine. The control system may include a boom member, a linear actuator connected to pivot the boom member in a first direction, a rotary actuator connected to swing the boom member in a second direction substantially orthogonal to the first direction, and an operator input device configured to generate a command signal indicative of a desired movement of the boom member. The control system may also include a tilt sensor configured to detect an inclination of the excavation machine, and a controller in communication with the rotary actuator, the operator input device, and the tilt sensor. The controller may be configured to receive a swing end stop for the boom member, to control the rotary actuator to move the boom member based on the command signal, and to modify the command signal to inhibit movement of the boom member past the swing end stop based on the detected inclination of the excavation machine.

Another aspect of the present disclosure is directed to a method of controlling a boom member of an excavation machine. The method may include receiving a swing end stop for the boom member, receiving a command to move the boom member, and swinging the boom member based on the command. The method may also include detecting an inclination of the excavation machine, and modifying the command to inhibit movement of the boom member past the swing end stop based on the detected inclination of the excavation machine.

DETAILED DESCRIPTION

Figure 1:
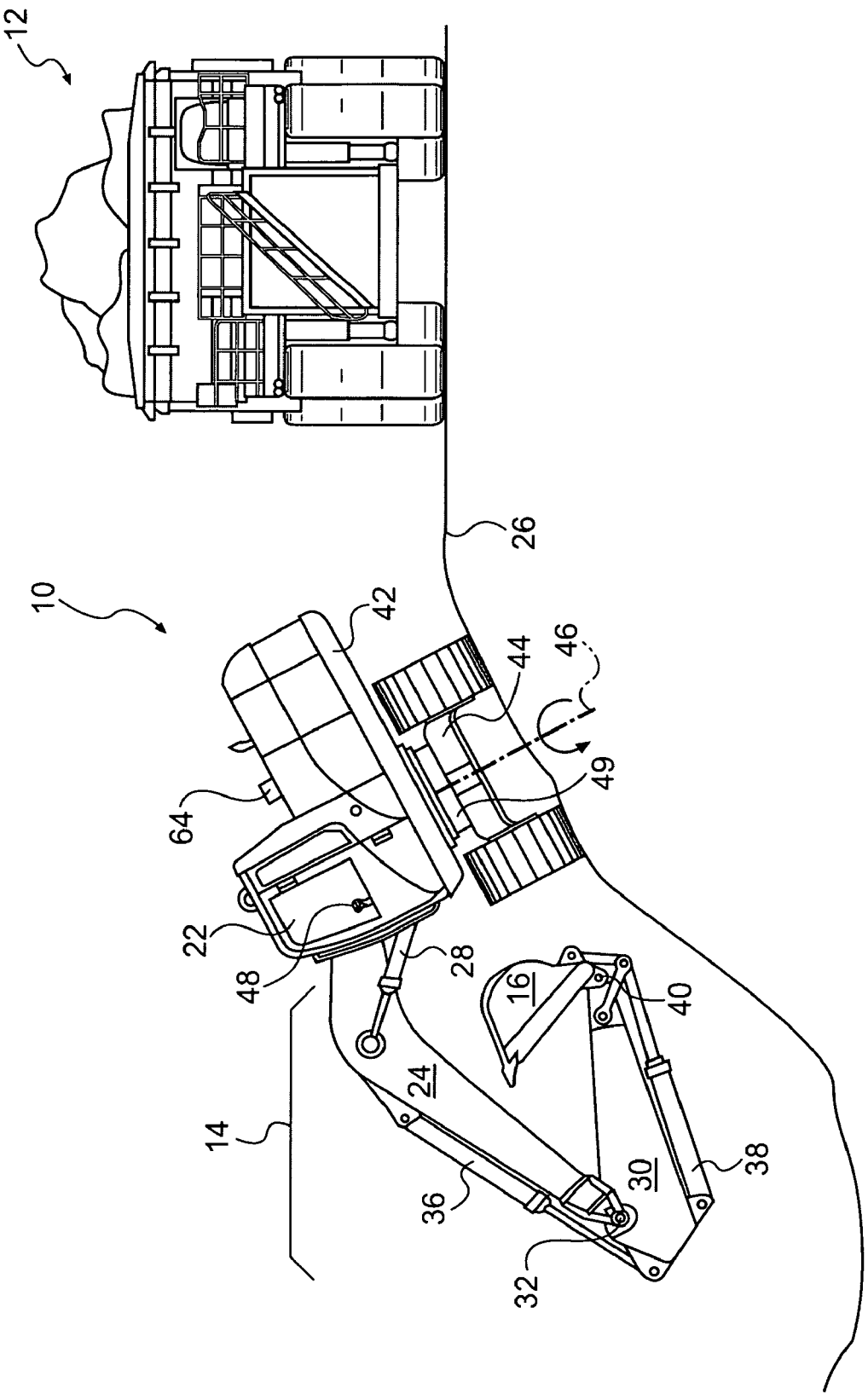
FIG. 1 is a diagrammatic illustration of an exemplary disclosed machine.

FIG. 1 illustrates an exemplary machine 10 having multiple systems and components that cooperate to excavate and load earthen material onto a nearby haul vehicle 12. In one example, machine 10 may embody a hydraulic excavator. It is contemplated, however, that machine 10 may embody another type of excavation machine such as a backhoe, a front shovel, a wheel loader, or another similar machine, if desired. Machine 10 may include, among other things, an implement system 14 configured to move a work tool 16 between a dig location (e.g., within a trench) and a dump location (e.g., over haul vehicle 12), and an operator station 22 for manual control of implement system 14.

Implement system 14 may include a linkage structure acted on by fluid actuators to move work tool 16. Specifically, implement system 14 may include a boom member 24 vertically pivotal relative to a work surface 26 by a pair of adjacent, double-acting, hydraulic cylinders 28 (only one shown in FIG. 1). Implement system 14 may also include a stick member 30 vertically pivotal about a horizontal axis 32 by a single, double-acting, hydraulic cylinder 36. Implement system 14 may further include a single, double-acting, hydraulic cylinder 38 operatively connected to work tool 16 to pivot work tool 16 vertically about a horizontal pivot axis 40. Boom member 24 may be pivotally connected to a frame 42 of machine 10. Frame 42 may be pivotally connected to an undercarriage member 44, and moved about a vertical axis 46 by a swing motor 49. Stick member 30 may pivotally connect work tool 16 to boom member 24 by way of pivot axes 40 and 32. It is contemplated that a greater or lesser number of fluid actuators may be included within implement system 14 and connected in a manner other than described above, if desired.

Each of hydraulic cylinders 28,36,38 may embody linear actuators having a tube and a piston assembly (not shown) arranged to form two separated pressure chambers. The pressure chambers may be selectively supplied with pressurized fluid and drained of the pressurized fluid to cause the piston assembly to displace within the tube, thereby changing an effective length of hydraulic cylinders 28, 36, 38. The flow rate of fluid into and out of the pressure chambers may relate to a speed of hydraulic cylinders 28, 36, 38, while a pressure differential between the two pressure chambers may relate to a force imparted by hydraulic cylinders 28, 36, 38 on the associated linkage members. The expansion and retraction of hydraulic cylinders 28, 36, 38 may function to assist in moving work tool 16.

Similar to hydraulic cylinders 28,36,38, swing motor 49 may also be driven by a fluid pressure differential. Specifically, swing motor 49 may be a rotary actuator including a first and a second chamber (not shown) located to either side of an impeller (not shown). When the first chamber is filled with pressurized fluid and the second chamber is drained of fluid, the impeller may be urged to rotate in a first direction. Conversely, when the first chamber is drained of fluid and the second chamber is filled with pressurized fluid, the impeller may be urged to rotate in an opposite direction. The flow rate of fluid into and out of the first and second chambers may determine a rotational speed of swing motor 49, while a pressure differential across the impeller may determine an output torque thereof.

Numerous different work tools 16 may be attachable to a single machine 10 and controllable via operator station 22. Work tool 16 may include any device used to perform a particular task such as, for example, a bucket, a fork arrangement, a blade, a shovel, or any other task-performing device known in the art. Although connected in the embodiment of FIG. 1 to pivot and swing relative to machine 10, work tool 16 may alternatively or additionally rotate, slide, or move in any other manner known in the art.

Operator station 22 may be configured to receive input from a machine operator indicative of a desired work tool movement. Specifically, operator station 22 may include one or more operator input devices 48 embodied as single or multi-axis joysticks located proximal an operator seat (not shown). Operator input devices 48 may be proportional-type controllers configured to position and/or orient work tool 16 by producing a work tool position signal that is indicative of a desired or commanded work tool speed and/or force in a particular direction. It is contemplated that different operator input devices may alternatively or additionally be included within operator station 22 such as, for example, wheels, knobs, push-pull devices, switches, pedals, and other operator input devices known in the art.

Figure 2:
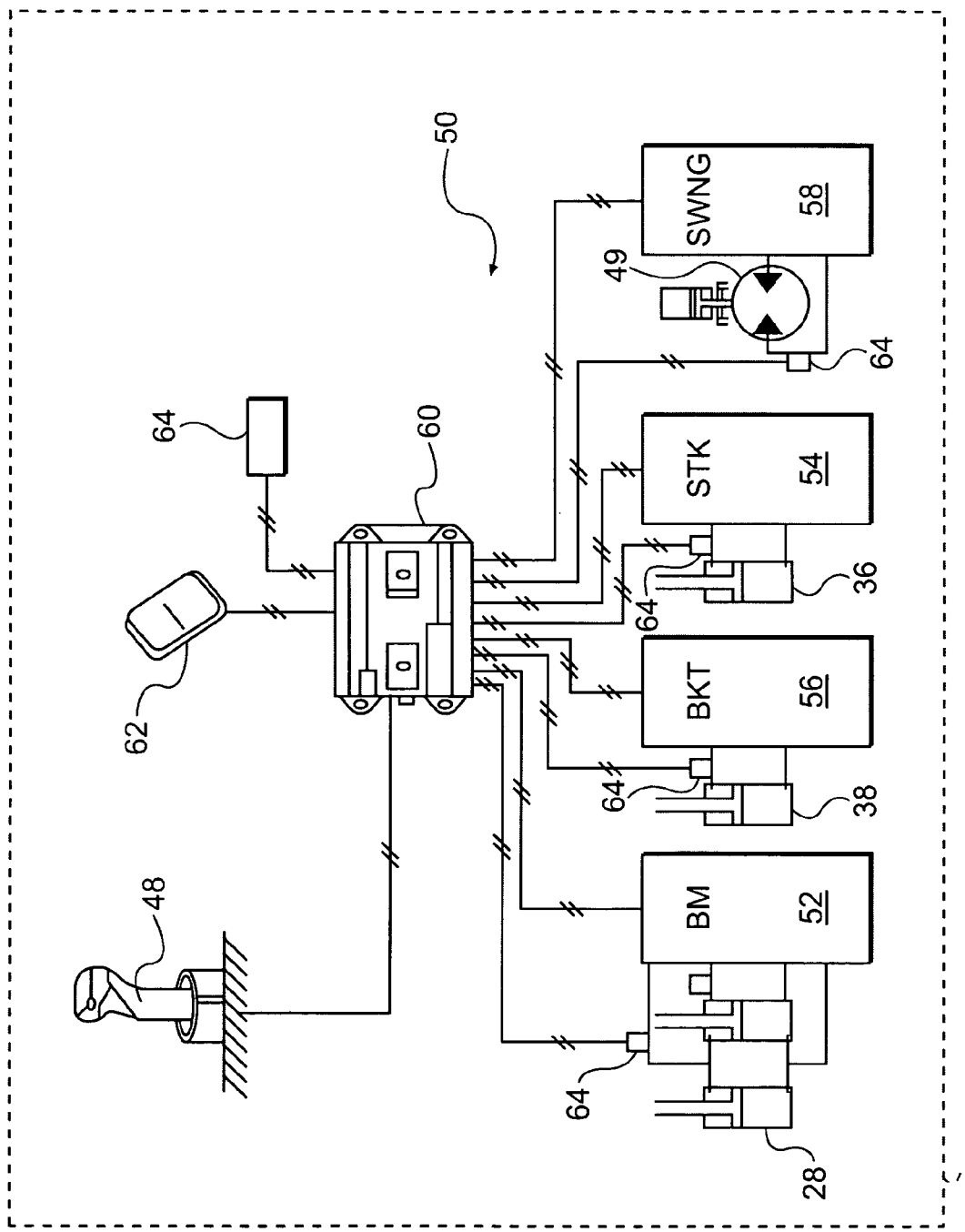
FIG. 2 is a schematic illustration of an exemplary disclosed control system that may be used with the machine of FIG. 1.

As illustrated in FIG. 2, machine 10 may include a hydraulic control system 50 having a plurality of fluid components that cooperate to move work tool 16 (referring to FIG. 1) in response to input received from operator input device 48. In particular, hydraulic control system 50 may include one or more fluid circuits (not shown) configured to produce and distribute streams of pressurized fluid. A boom control valve 52, a stick control valve 54, a bucket control valve 56, and a swing control valve 58 may be situated to receive the streams of pressurized fluid and selectively meter the fluid to and from hydraulic cylinders 28, 36, 38 and swing motor 49, respectively, to regulate the motions thereof. Specifically, boom control valve 52 may have elements movable in response to operator input to control the motion of hydraulic cylinders 28 associated with boom member 24; bucket control valve 56 may have elements movable to control the motion of hydraulic cylinder 38 associated with work tool 16; stick control valve 54 may have elements movable to control the motion of hydraulic cylinder 36 associated with stick member 30; and swing control valve 58 may have elements movable to control the swinging motion of frame 42 imparted by swing motor 49.

Because the elements of boom, bucket, stick and swing control valves 52-58 may be similar and function in a related manner, only the operation of swing control valve 58 will be discussed in this disclosure. In one example, swing control valve 58 may include a first chamber supply element (not shown), a first chamber drain element (not shown), a second chamber supply element (not shown), and a second chamber drain element (not shown). To swing boom member 24 in a first direction (i.e., to rotate boom member 24 relative to undercarriage member 44 in a clockwise direction), the first chamber supply element may be moved to allow the pressurized fluid to fill the first chamber of swing motor 49 with pressurized fluid, while the second chamber drain element may be moved to drain fluid from the second chamber of swing motor 49. To swing boom member 24 in the opposite direction (i.e., to rotate boom member 24 relative to undercarriage member 44 in a counterclockwise direction), the second chamber supply element may be moved to fill the second chamber of swing motor 49 with pressurized fluid, while the first chamber drain element may be moved to drain fluid from the first chamber of swing motor 49. It is contemplated that both the supply and drain functions may alternatively be performed by a single element associated with the first chamber and a single element associated with the second chamber, or by a single valve that controls all filling and draining functions, if desired.

The supply and drain elements of swing control valve 58 may be solenoid movable against a spring bias in response to a command from operator input device 48. In particular, swing motor 49 may rotate at a speed that substantially corresponds to the flow rate of fluid into and out of the first and second chambers, and with a force that corresponds with a pressure of the fluid. To achieve an operator-desired or commanded swing speed and/or force indicated via the input device position signal, a related command based on an assumed or measured pressure may be sent to the solenoids (not shown) of the supply and drain elements that causes them to open an amount corresponding to the necessary flow rate. As such, a greater opening amount of the supply and drain elements may result in a higher swing speed of boom member 24, while a smaller opening amount (i.e., a restricted opening) may result in a slower swing speed of boom member 24. When the supply and drain elements are completely closed, the swinging movement of boom member 24 may be inhibited. The command may be in the form of a flow rate command or a valve element position command.

Hydraulic control system 50 may also include a controller 60 in communication with operator input device 48 and control valves 52-58 to coordinate the movements described above. Controller 60 may embody a single microprocessor or multiple microprocessors that include a means for controlling an operation of hydraulic control system 50. Numerous commercially available microprocessors can be configured to perform the functions of controller 60. It should be appreciated that controller 60 could readily be embodied in a general machine microprocessor capable of controlling numerous machine functions. Controller 60 may include a memory, a secondary storage device, a processor, and any other components for running an application. Various other circuits may be associated with controller 60 such as power supply circuitry, signal conditioning circuitry, solenoid driver circuitry, and other types of circuitry.

One or more maps relating the input device position signal, desired actuator speed or force, associated flow rates and pressures, and/or valve element positions associated with movement of hydraulic cylinders 28-36 and swing motor 49 may be stored in the memory of controller 60. Each of these maps may include a collection of data in the form of tables, graphs, and/or equations. In one example, desired speed and commanded flow rate may form the coordinate axis of a 2-D table for control of the first and second chamber supply and drain elements described above. The commanded flow rate required to move the fluid actuators at the desired speed and the corresponding valve element position of the appropriate supply and/or drain element may be related in another separate 2-D map or together with desired speed in a single 3-D map. It is also contemplated that desired actuator speed may be directly related to the valve element position in a single 2-D map. Controller 60 may be configured to allow the operator of machine 10 to directly modify these maps and/or to select specific maps from available relationship maps stored in the memory of controller 60 to affect fluid actuator motion. It is contemplated that the maps may additionally or alternatively be automatically selectable based on modes of machine operation, if desired.

Controller 60 may be configured to receive input from operator input device 48 and to command operation of control valves 52-58 in response to the input and based on the relationship maps described above. Specifically, controller 60 may receive the input device position signal indicative of a desired speed and/or force of work tool 16 in a particular direction, and reference the selected and/or modified relationship maps stored in the memory of controller 60 to determine flow rate values and/or associated positions for each of the supply and drain elements within control valves 52-58. The flow rates or positions may then be commanded of the appropriate supply and drain elements to cause filling and/or draining of the first or second chambers at a rate that results in the desired work tool movement.

Hydraulic control system 50 may be equipped with one or more sensory elements 64 necessary for the control of machine 10. In one example, the sensory elements 64 may be position sensors associated with each of hydraulic cylinders 28, 38, 36 and/or swing motor 49. In another example, the sensory elements 64 may be angle sensors associated with the pivot joints of implement system 14. In yet another example, the sensory elements 64 may be tilt sensors configured to detect a pitch and a roll of frame 42. In still another example, the sensory elements 64 may be load sensors configured to detect a payload of work tool 16 (i.e., a mass of material contained within and transported by work tool 16). Based on signals generated from sensory elements 64 and based on known kinematics of machine 10, controller 60 may be configured to command control valves 52-58 to position work tool 16 relative to the dig and dump locations at the operator desired speeds and/or forces. In addition, based on the signals generated by sensory elements 64, controller 60 may be able to derive and record positions, velocities, accelerations, orientations, masses, and/or inertias of implement system 14, if desired.

In some situations, controller 60 may be configured to selectively limit movement of implement system 14. That is, although boom member 24 and attached stick member 30 and work tool 16 may be mechanically capable of swinging in a full circle about undercarriage member 44 (i.e., through a range of about 360° about vertical axis 46), an operator of machine 10 may desire to artificially limit the motion thereof to a smaller fraction of that range. For example, if an obstacle is located behind machine 10, in order to avoid an undesired collision with the obstacle, an operator of machine 10 may limit the swinging range of implement system 14 to about 180° such that work tool 16 may only be moved through an excavation area in front of machine 10. The range may be limited when an operator sets one or more swing end stops for boom member 24. When two swing end-stops have been set by the operator, the range of motion allowed for boom member 24 (i.e., the range of motion through which swing motor 49 may operate) may be that range between the two swing end stops. For example, if a first end stop is located at 25° right of a neutral position, and a second end stop is located at 15° left, the range of motion is effectively reduced to 40°, and skewed to the right of the neutral position.

The swing end stops may be set by an operator of machine 10 by way of input device 48 and a set switch 62. Specifically, an operator may control implement system 14 via input device 48 to position work tool 16 at one end stop, and depress set switch 62 to designate that position as a swing end stop. The operator may then swing boom member 24 through an allowed excavation area to a second position, and depress set switch 62 to designate that position as another swing end stop. Thereafter, controller 60 may inhibit motion of boom member 24 outside of the allowed excavation area.

As boom member 24 approaches either of the two swing end stops, controller 60 may modify the command directed from operator input device 48 to swing control valve 58 and/or the other control valves 52-56. That is, controller 60 may attenuate the command such that movement of boom member 24 is still responsive to operator input, yet boom member 24 is inhibited from swinging past the respective end stop. Specifically, as boom member 24 approaches a swing end stop, controller 60 may begin to restrict the flow of fluid through swing control valve 58 (i.e., through the supply and/or drain elements of swing control valve 58), and increase the restriction as boom member 24 gets closer and closer such that boom member 24 is slowed and brought to a stop in a smooth manner at the operator-set swing end stop. Alternatively, instead of restricting a flow of fluid through swing control valve.58 to slow the movement of boom member 24, controller 60 may reverse the flow of fluid through control valve 58 to actively brake the movement of boom member 24, if desired. When moving away from a swing end stop, however, regardless of how close boom member 24 is to that swing end stop, the flow of fluid through swing control valve 58 may be substantially unrestricted by controller 60 (i.e., the command from input device 48 indicative of a desired movement of work tool 16 may be substantially unmodified by controller 60). In this manner, movement of implement system 14 may remain responsive to operator input, without boom member 24 swinging past an operator-set end stop.

In some situations, the operator may desire to freely move past the end stop. In these situations, after controller 60 has stopped the movement of boom member 24, the operator may move operator input device 48 to a neutral position to signal a desire to freely move boom member 24 (i.e., to move boom member 24 past the end stop without restriction by controller 60). By moving operator input device 48 to the neutral position, controller 60 may be reset and allow movement past the end stop. In one example, this movement past the end stop may still be limited to a specific range, speed, and/or force and, as long as movement of boom member 24 is maintained within these limits, controller 60 may not interfere with the movement thereof.

Controller 60 may regulate the restriction of swing control valve 58 (i.e., may modify the command sent to swing control valve 58) based on various measure, estimated, and/or predicted performance parameters of machine 10. For example, controller 60 may consider a payload of work tool 16, a swing velocity of boom member 24, and an inclination (i.e., a pitch and a roll) of frame 42 provided by sensory elements 64 when restricting the flow of fluid through swing control valve 58. In this manner, boom member 24 may be gradually and responsively brought to rest at the appropriate swing end stops under changing machine and environmental conditions (i.e., when heavily loaded, when lightly loaded, when swinging fast, when swinging slow, when swinging under the force of gravity, when swinging against the force of gravity, etc.).

INDUSTRIAL APPLICABILITY

The disclosed control system may be applicable to any excavation machine that benefits from selective movement limitations of an associated tool. The disclosed control system may allow an operator to set swing end stops and control movement of the tool to maintain the tool within an allowed excavation area defined by the swing end stops. The operation of hydraulic control system 50 will now be explained.

During operation of machine 10, a machine operator may define two spaced apart swing end stops for work tool 16. For example, the operator may manipulate operator input device 48 to swing boom member 24 to a first swing end stop 45° left of a neutral position, and depress set switch 62. The operator may then manipulate operator input device 48 to swing boom member 24 to a second swing end stop 15° right of a neutral position, and depress set switch 62. As a result, the range of motion between the first and second swing end stops may be designated as an allowed excavation area.

During operator control of implement system 14, an operator may manipulate operator input device 48 to cause boom member 24 to swing toward the first swing end stop. As a result of the manipulation, controller 60 may command swing control valve 58 to pass pressurized fluid to swing motor 49 and to drain fluid from swing motor 49 at a rate corresponding to an operator desired speed of boom member 24. And, as boom member 24 nears the first swing end stop (i.e., is within a predetermined distance of the first swing end stop), controller 60 may attenuate the commands directed to swing control valve 58 to decrease the flow rate of fluid to and from swing motor 49 (i.e., to restrict a flow of fluid through swing control valve 58). As the flow rate through swing control valve 58 is reduced, the speed of boom member 24 may also be reduced proportionally. And, as boom member 24 gets closer and closer to the first swing end stop, the flow rate and resulting swing speed may be reduced to zero.

Controller 60 may account for velocity when limiting the motion of boom member 24. In particular, based on signals from sensory elements 64, controller 60 may detect a swing velocity of boom member 24. And, based on the velocity of boom member 24, controller 60 may adjust the amount of restriction applied to swing control valve 58. That is, for a given loading of boom member 24 and a higher velocity, the restriction of swing control valve 58 may be increased to a greater extent as boom member 24 nears the first swing end stop to account for the increased inertia of the fast-moving tool. In contrast, for a given loading of boom member 24 and a lower velocity, the restriction of swing control valve 58 may be increased to a lesser extent as boom member 24 nears the first swing end stop. In this manner, whether swinging slow or fast, controller 60 may account for the inertia of boom member 24 when stopping boom member 24 at the first swing end stop.

Controller 60 may account for load when limiting the motion of boom member 24. In particular, based on signals from sensory elements 64, controller 60 may detect a loading of work tool 16. And, based on the loading of work tool 16, controller 60 may adjust the restriction of swing control valve 58. That is, for a given velocity of boom member 24 and a heavier load, the restriction of swing control valve 58 may be increased to a greater extent as boom member 24 nears the first swing end stop to account for the increased inertia of the loaded tool. In contrast, for a given velocity of boom member 24 and a lighter load, the restriction of swing control valve 58 may be increased to a lesser extent as boom member 24 nears the first swing end stop. In this manner, whether loaded lightly or heavily, controller 60 may account for the inertia of boom member 24 when stopping boom member 24 at the first swing end stop.

Controller 60 may account for inclination when limiting the motion of boom member 24. In particular, based on signals from sensory elements 64, controller 60 may detect an inclination (i.e., a pitch and a roll) of work tool 16, and estimate an effect the inclination may have on the speed and/or force of boom member 24. And, based on the inclination of machine 10 (i.e., based on the estimated effect of the inclination), controller 60 may adjust the restriction of swing control valve 58. That is, for a given velocity and loading of boom member 24, the restriction of swing control valve 58 may be increased to a greater extent as boom member 24 nears the first end stop when the swinging motion of boom member 24 is aligned with the pull of gravity (i.e., when gravity is acting to speed up the motion of boom member 24). This situation is depicted in FIG. 1, with the first end stop be at a dig location gravitationally lower than the dump location over haul vehicle 12. In contrast, for a given velocity and loading of boom member 24, the restriction of swing control valve 58 may be increased to a lesser extent as boom member 24 nears the first end stop when the swinging motion of boom member 24 is against the pull of gravity (i.e., when gravity is acting to slow the motion of boom member 24). This situation is depicted in FIG. 1, with the first end stop be at the dump location gravitationally higher than the dig location. In this manner, whether machine 10 is working on an incline or on a level work surface, controller 60 may account for the effects of gravity on boom member 24 when stopping boom member 24 at the first swing end stop.

Several benefits may be associated with the disclosed excavation control system. First, the disclosed excavation control system may provide control over a swinging movement of the excavator during a side-to-side movement operation (i.e., during a non-digging operation such as a swing-to-truck or a return-to-trench movement). This control may minimize the likelihood of undesired collisions and help improve productivity of the excavation machine. In addition, the disclosed excavation control system may account for side-to-side tilting (i.e., rolling) of the excavation machine, which can have a significant impact on the swinging velocities and forces of the excavator. As a result, work tool 16 may be more likely to remain within the allowed excavation area.

It will be apparent to those skilled in the art that various modifications and variations can be made to the disclosed excavation control system. Other embodiments will be apparent to those skilled in the art from consideration of the specification and practice of the disclosed excavation control system. It is intended that the specification and examples be considered as exemplary only, with a true scope being indicated by the following claims and their equivalents.

What is claimed is:

1. A control system for use with an excavation machine, comprising:
   a boom member;
   a linear actuator connected to pivot the boom member in a first direction;
   a rotary actuator connected to swing the boom member in a second direction substantially orthogonal to the first direction;
   an operator input device configured to generate a command signal indicative of a desired movement of the boom member;
   a tilt sensor configured to detect an inclination of the excavation machine; and
   a controller in communication with the rotary actuator, the operator input device, and the tilt sensor, the controller being configured to:
      receive a swing end stop for the boom member;
      control the rotary actuator to move the boom member based on the command signal; and
      modify the command signal based on the detected inclination in a manner to account for an effect the detected inclination will have on a speed and force of the boom member to inhibit movement of the boom member past the swing end stop.

2. The control system of claim 1, wherein the swing end stop is adjustable and configured to be set by an operator of the excavation machine.

3. The control system of claim 2, wherein the controller is configured to receive two swing end stops bounding an allowed area of excavation within a mechanical range of boom member movement.

4. The control system of claim 1, further including a control valve configured to regulate fluid communication of the rotary actuator based on the command signal, wherein the controller is configured to estimate an effect the detected inclination will have on a speed and a force of the boom member at the swing end stop, and to modify the command signal based on the estimated effect of the detected inclination.

5. The control system of claim 4, further including a load sensor configured to generate a load signal associated with the boom member, wherein the controller is configured to modify the command signal based further on the load signal.

6. The control system of claim 4, further including a swing velocity sensor configured to generate a velocity signal associated with the boom member, wherein the controller is configured to modify the command signal based further on the velocity signal.

7. The control system of claim 4, wherein the controller is configured to modify the command signal to restrict or reverse a flow of fluid through the control valve by an increasing amount as the boom member nears the swing end stop.

8. The control system of claim 7, wherein a flow of fluid through the control valve during boom member movement away from the swing end stop is substantially unrestricted.

9. The control system of claim 1, wherein the tilt sensor is configured to detect a pitch and a roll of the excavation machine, and the controller is configured to modify the command signal based on the detected pitch and roll.

10. A method of controlling an excavation machine having a boom member, comprising:
   receiving a swing end stop for the boom member;
   receiving a command from an operator input device to move the boom member;
   swinging the boom member using a rotary actuator based on the command;
   detecting an inclination of the excavation machine using a tilt sensor; and
   modifying the command based on the detected inclination in a manner to account for an effect that the detected inclination will have on a speed and a force of the boom member to inhibit movement of the boom member past the swing end stop.

11. The method of claim 10, wherein the swing end stop is adjustable and set at a location desired by an operator of the excavation machine.

12. The method of claim 11, wherein receiving a swing end stop includes receiving two swing end stops bounding an allowed area of excavation within a mechanical range of boom member movement.

13. The method of claim 10, further including estimating an effect the detected inclination will have on a speed and a force of the boom member at the swing end stop, wherein the command is modified to account for the estimated speed and force such that the boom member slows to a stop at the swing end stop.

14. The method of claim 13, further including sensing a load of the boom member, wherein modifying the command includes modifying the command based further on the sensed load.

15. The method of claim 13, further including sensing a swing velocity of the boom member, wherein modifying the command includes modifying the command based further on the sensed velocity.

16. The method of claim 10, wherein modifying the command includes reducing a commanded velocity of the boom member by an increasing amount substantially proportional to a distance from the boom member to the swing end stop.

17. The method of claim 16, wherein a commanded velocity of the boom member movement away from the swing end stop is substantially unmodified.

18. The method of claim 10, wherein the detecting an inclination of the excavation machine includes detecting a pitch and a roll of the excavation machine, and modifying the command includes modifying the command based on the detected pitch and roll.

19. An excavation machine, comprising:
   a frame;
   a boom member connected to the frame;
   a linear actuator connected to pivot the boom member in a first direction relative to the frame;
   a hydraulic rotary actuator configured to swing the boom member in a second direction substantially orthogonal to the first direction;
   a tool operatively connected to the boom member;
   an operator input device configured to generate a command signal indicative of a desired movement of the boom member;
   a tilt sensor configured to detect a pitch and a roll of the frame;
   a load sensor configured to detect a load of the boom member; and
   a controller in communication with the hydraulic rotary actuator, the operator input device, and the tilt sensor, the controller being configured to:
      receive an operator set swing end stop for the boom member;
      control the hydraulic rotary actuator to move the boom member based on the command signal; and
      modify the command signal based on the load of the boom member and based on the detected pitch and roll in a manner to account for an effect the load and the detected pitch and roll will have on a speed and force of the boom member to inhibit movement of the boom member past the swing end stop.

20. The excavation machine of claim 19, further including a control valve configured to regulate a flow of fluid through the hydraulic rotary actuator, wherein the controller is configured to modify the command signal to restrict a flow of fluid through the control valve by an increasing amount proportional to a distance from the boom member to the swing end stop, and a flow of fluid through the control valve during boom member movement away from the swing end stop is substantially unrestricted.

* * * * *

UNITED STATES PATENT AND TRADEMARK OFFICE
CERTIFICATE OF CORRECTION

PATENT NO. : 7,975,410 B2
APPLICATION NO. : 12/155195
DATED : July 12, 2011
INVENTOR(S) : Faivre et al.

It is certified that error appears in the above-identified patent and that said Letters Patent is hereby corrected as shown below:

In the Specification

Column 3, line 7, delete "28,36,38" and insert -- 28, 36, 38 --.

Column 3, line 21, delete "28,36,38," and insert -- 28, 36, 38, --.

Column 6, line 46, delete "valve.58" and insert -- valve 58 --.

Signed and Sealed this
Fourteenth Day of July, 2015

Michelle K. Lee
*Director of the United States Patent and Trademark Office*